United States Patent
Crews et al.

(10) Patent No.: US 8,980,098 B2
(45) Date of Patent: Mar. 17, 2015

(54) RECHARGEABLE SURFACE ACTIVE POROUS MEDIA FOR REMOVAL OF ORGANIC MATERIALS FROM AQUEOUS FLUIDS

(75) Inventors: James B. Crews, Willis, TX (US); Tianping Huang, Spring, TX (US)

(73) Assignee: Baker Hughes Incorporated, Houston, TX (US)

(*) Notice: Subject to any disclaimer, the term of this patent is extended or adjusted under 35 U.S.C. 154(b) by 416 days.

(21) Appl. No.: 13/364,847

(22) Filed: Feb. 2, 2012

(65) Prior Publication Data

US 2012/0138538 A1 Jun. 7, 2012

Related U.S. Application Data

(63) Continuation-in-part of application No. 12/546,763, filed on Aug. 25, 2009, now Pat. No. 8,230,923, and a continuation-in-part of application No. 12/111,361, filed on Apr. 29, 2008, now Pat. No. 8,226,830, which (Continued)

(51) Int. Cl.
  *C02F 1/28* (2006.01)
  *B01D 15/00* (2006.01)
  (Continued)

(52) U.S. Cl.
  CPC .............. *C09K 8/5045* (2013.01); *C02F 1/283* (2013.01); *C02F 1/288* (2013.01); *C09K 8/516* (2013.01);
  (Continued)

(58) Field of Classification Search
  CPC .. C02F 1/283; C02F 2101/30; C02F 2305/08; C02F 1/288; C02F 2303/16; C09K 8/5045; C09K 8/516; C09K 8/665; C09K 8/805; C09K 2208/10; E21B 43/267; E21B 43/00666

USPC .................................. 210/670, 679, 694, 690
See application file for complete search history.

(56) References Cited

U.S. PATENT DOCUMENTS 3,675,717 A 7/1972 Goins et al.
4,031,959 A 6/1977 Henderson
(Continued)

FOREIGN PATENT DOCUMENTS

WO 2007041553 A2 4/2007
WO 2008036812 A2 3/2008
WO 2009063165 A2 5/2009

OTHER PUBLICATIONS

Y. Taguchi et al., Preparation of find composite particles composed of inorganic solid powders and organic polymers by utilizing liquid-liquid dispersion, Colloids and Surfaces A: Physiochemical and Engineering Aspects, vol. 153, 1999, pp. 401-404 (XP002530896).

(Continued)

*Primary Examiner* — Matthew O Savage
(74) *Attorney, Agent, or Firm* — Mossman Kumar & Tyler PC

(57) ABSTRACT

Organic material may be removed from a fluid, such as an aqueous fluid, by contacting the fluid with a surface active porous medium. The surface active porous medium includes a bed of substrate particles (e.g. sand), at least a partial coating of nanoparticles on the substrate bed, and a plurality of absorbing particles fixated on the nanoparticles. The absorbing particles may include, but are not necessarily limited to, coal fines, activated carbon, activated charcoal, activated coal and combinations thereof. The surface active porous medium may be regenerated by contacting the surface active porous medium with an acid solution to substantially remove the organic materials therefrom.

9 Claims, 3 Drawing Sheets

Related U.S. Application Data is a continuation-in-part of application No. 11/931,501, filed on Oct. 31, 2007, now Pat. No. 7,721,803, and a continuation-in-part of application No. 12/277,825, filed on Nov. 25, 2008, now abandoned, which is a continuation-in-part of application No. 11/931,706, filed on Oct. 31, 2007, now abandoned.

(51) Int. Cl.

| | | |
|---|---|---|
| C09K 8/504 | (2006.01) | |
| C09K 8/516 | (2006.01) | |
| C09K 8/66 | (2006.01) | |
| C09K 8/80 | (2006.01) | |
| E21B 43/00 | (2006.01) | |
| E21B 43/267 | (2006.01) | |
| C02F 101/30 | (2006.01) | |

(52) U.S. Cl.
CPC .............. *C09K 8/665* (2013.01); *C09K 8/805* (2013.01); *E21B 43/006* (2013.01); *E21B 43/267* (2013.01); *C02F 2101/30* (2013.01); *C02F 2303/16* (2013.01); *C02F 2305/08* (2013.01); *C09K 2208/10* (2013.01)
USPC .......................... 210/670; 210/679; 210/690

(56) References Cited

U.S. PATENT DOCUMENTS

| | | | | |
|---|---|---|---|---|
| 4,643,831 | A | | 2/1987 | Fletcher |
| 5,266,540 | A | * | 11/1993 | Menicagli et al. ............... 502/5 |
| 5,518,996 | A | | 5/1996 | Maroy et al. |
| 5,775,425 | A | | 7/1998 | Weaver et al. |
| 6,838,005 | B2 | | 1/2005 | Tepper et al. |
| 6,860,924 | B2 | * | 3/2005 | Rajagopalan et al. .......... 96/154 |
| 6,919,029 | B2 | | 7/2005 | Meng et al. |
| 7,081,439 | B2 | | 7/2006 | Sullivan et al. |
| 7,131,491 | B2 | | 11/2006 | Blauch et al. |
| 7,204,311 | B2 | | 4/2007 | Welton et al. |
| 7,211,320 | B1 | | 5/2007 | Cooper et al. |
| 7,258,170 | B2 | | 8/2007 | Nguyen et al. |
| 7,543,646 | B2 | | 6/2009 | Huang et al. |
| 7,550,413 | B2 | | 6/2009 | Huang et al. |
| 7,703,531 | B2 | | 4/2010 | Huang et al. |
| 7,721,803 | B2 | | 5/2010 | Huang et al. |
| 8,499,832 | B2 | * | 8/2013 | Crews et al. ................. 166/276 |
| 2001/0023849 | A1 | | 9/2001 | Robertson |
| 2003/0134409 | A1 | | 7/2003 | Mallouk et al. |
| 2003/0155302 | A1 | * | 8/2003 | Meng et al. .................... 210/665 |
| 2004/0137209 | A1 | | 7/2004 | Zeller et al. |
| 2005/0107265 | A1 | | 5/2005 | Sullivan et al. |
| 2005/0252658 | A1 | | 11/2005 | Willingham et al. |
| 2006/0065398 | A1 | | 3/2006 | Brannon et al. |
| 2006/0113080 | A1 | | 6/2006 | Nguyen et al. |
| 2006/0260997 | A1 | * | 11/2006 | Nelson et al. ................. 210/263 |
| 2007/0036977 | A1 | | 2/2007 | Sinclair et al. |
| 2007/0066491 | A1 | | 3/2007 | Bicerano et al. |
| 2007/0104923 | A1 | | 5/2007 | Whitaker et al. |
| 2007/0151726 | A1 | | 7/2007 | Crews et al. |
| 2007/0175196 | A1 | | 8/2007 | Tepper et al. |
| 2008/0023201 | A1 | | 1/2008 | Huang et al. |
| 2008/0051302 | A1 | | 2/2008 | Crews et al. |
| 2008/0060812 | A1 | | 3/2008 | Huang et al. |
| 2008/0087429 | A1 | | 4/2008 | Brannon et al. |
| 2008/0099207 | A1 | | 5/2008 | Venditto et al. |
| 2008/0248978 | A1 | | 10/2008 | Huang et al. |
| 2009/0111718 | A1 | | 4/2009 | Gadiyar et al. |
| 2009/0312201 | A1 | | 12/2009 | Huang et al. |

OTHER PUBLICATIONS

J. Hibbeler, et al., "An Integrated Long-Term Solution for Migratory Fines Damages," SPE 81017, SPE Latin American and Caribbean Petroleum Engineering Conference, Apr. 27-30, 2003, pp. 1-11, Port-of-Spain, Trinidad, West Indies.

P.D. Nguyen, et al., "Controlling Formation Fines at Their Sources to Maintain Well Productivity," SPE 97659, SPE International Improved Oil Recovery Conference in Asia Pacific, Kuala Lumpur, Dec. 5-6, 2005; republished SPE Production & Operations, May 2007, pp. 202-215.

C. Lu, et al., "Chemical Modification of Multiwalled Carbon Nanotubes for Sorption of Zn2+ from Aqueous Solution," Chemical Engr'g Jnl, 2008, pp. 462-468, vol. 139.

A.T. Heitsch, et al., "Multifunctional Particles: Magnetic Nanocrystals and Gold Nanorods Coated With Fluorescent Dye-doped Silica Shells," Jnl of Solid State Chemistry, 2008, pp. 1590-1599, vol. 181.

* cited by examiner

RECHARGEABLE SURFACE ACTIVE POROUS MEDIA FOR REMOVAL OF ORGANIC MATERIALS FROM AQUEOUS FLUIDS

CROSS-REFERENCE TO RELATED APPLICATIONS

This application is: a continuation-in-part patent application of U.S. Ser. No. 12/546,763 filed Aug. 25, 2009, now U.S. Pat. No. 8,230,923 which is: a continuation-in-part patent application of U.S. Ser. No. 11/931,501 filed Oct. 31,2007, now U.S. Pat. No. 7,721,803; and a continuation-in-part patent application of U.S. Ser. No. 12/277,825 filed Nov. 25, 2008, now abandoned; which in turn is a continuation-in-part patent application of U.S. Ser. No. 11/931,706 also filed Oct. 31,2007, now abandoned; and a continuation-in-part patent application of U.S. Ser. No. 12/111,361 filed Apr. 29, 2008, now U.S. Pat. No. 8,226,830; all of which are incorporated herein in their entirety.

TECHNICAL FIELD

The present invention relates to methods and compositions for removing organic materials from fluids such as aqueous fluids, and more particularly relates, in one non-limiting embodiment, to methods and compositions for removing organic materials from aqueous fluids by passing the fluids through a surface active porous medium and adsorbing the organic materials from the fluid.

BACKGROUND

Many methods and processes are known to clean, purify, clarify and otherwise treat fluids for proper disposal, consumption, use, and other needs. These methods include, but are not necessarily limited to, centrifugation and filtration to remove particulates, chemical treatments to sterilize water, distillation to purify liquids, decanting to separate two phases of fluids, reverse osmosis to desalinate liquids, electrodialysis to desalinate liquids, pasteurization to sterilize food-stuffs, and catalytic processes to covert undesirable reactants into useful products. Each of these methods is well-suited for particular applications and typically a combination of methods is used for a final product.

More particularly, removing hydrocarbons and organic materials from fluids, particularly aqueous fluids, is a significant part of these purifying processes, particularly in the discipline of recovering hydrocarbons from subterranean formations. Such processes include, but are not necessarily limited to, settling tanks, electrostatic separators, cyclonic separation, demulsification using chemical demulsifiers and combinations of these. While many of these processes are commercially useful, there is often a need to remove hydrocarbons and organic materials to a very low level. It is typically difficult, for instance, to remove all of the organic material from water so that the water may be understood as pure, such as for consumption or re-use.

There is always a need to develop new apparatus and compositions that will remove as much as possible the amount of hydrocarbons and organic materials from aqueous fluids, even after such materials have been otherwise substantially removed from the fluids.

SUMMARY

There is provided, in one non-limiting form, a method for removing organic material from a fluid. The method involves contacting a surface active porous medium with the fluid containing at least one organic material. The surface active porous medium includes, but is not necessarily limited to: a bed of substrate particles, at least a partial coating of nanoparticles fixated on the substrate bed, and a plurality of adsorbent particles fixated on the nanoparticles. The adsorbent particles include, but are not necessarily limited to, coal fines, activated carbon, activated charcoal, activated coal and combinations thereof. The method further involves adsorbing at least part of the at least one organic material on the adsorbent particles of the surface active porous medium.

There is also provided in one non-restrictive embodiment, the surface active porous medium per se described above.

There is additionally provided in another non-limiting embodiment a method of regenerating the surface active porous medium, where the regenerating includes contacting the surface active porous medium with an acid solution thereby substantially removing the organic materials therefrom.

The nanoparticles or particulate additives, also referred to herein as nano-sized particles (e.g. MgO and/or $Mg(OH)_2$, and the like), appear to fixate or flocculate the adsorbent particles, e.g. coal fines, whether or not they are charged, onto the substrate particles. Due to at least in part to their small size, the surface forces (like van der Waals and electrostatic forces) of the nanoparticles help them associate, group or flocculate the fines together in larger collections, associations or agglomerations. Such groupings or associations help fix the fines in place and keep or inhibit them from moving. The adsorbent particles then adsorb the hydrocarbons and organic materials from the fluid when the fluid contacts the surface active porous medium.

The nanoparticles may include, but are not necessarily limited to, alkaline earth metal oxides, such as magnesium oxide; alkaline earth metal hydroxides, such as calcium hydroxide; transition metal oxides, such as titanium oxide and zinc oxide; transition metal hydroxides; post-transition metal oxides, such as aluminum oxide; post-transition metal hydroxides; piezoelectric crystals and/or pyroelectric crystals such as ZnO and $AlPO_4$.

DETAILED DESCRIPTION

Figure 1:
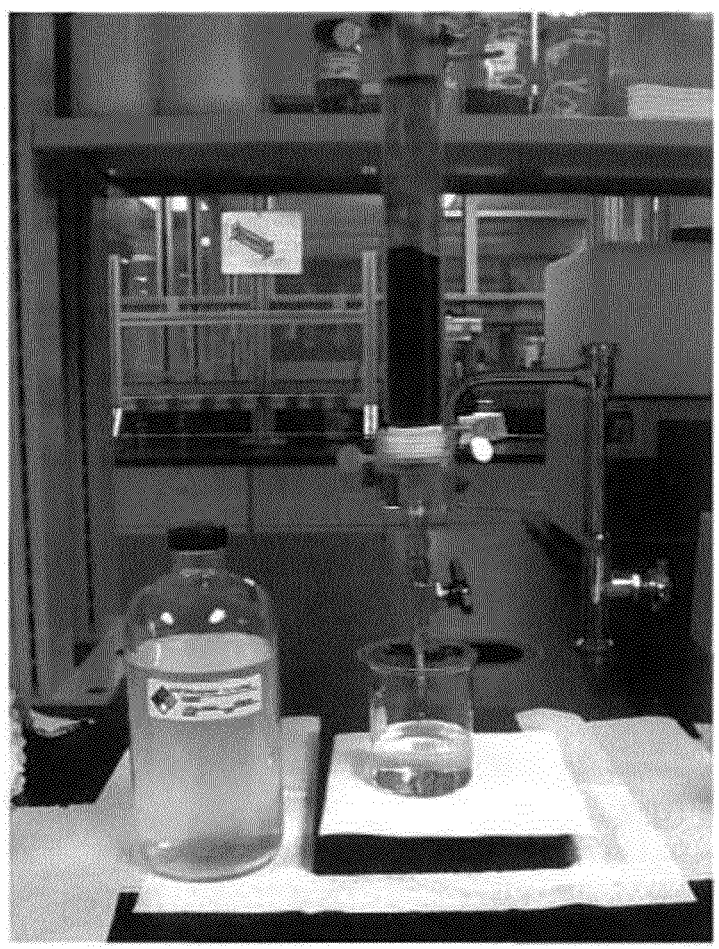
FIG. 1 is a photograph of the test set-up for proving the method concept.

It has been discovered that coal fines can be fixated onto particles like sand, ceramic and other substrate particles by nanoparticles to give a surface active porous medium which may remove organic materials and other components due to the presence of the secondary adsorbent particles. The adsorbent particles may include, but not necessarily be limited to, coal fines and activated carbon particles. Laboratory tests show that coal fines and activated carbon particles do not fixate very well onto quartz sand particles by themselves. Wash-off tests showed that water will remove a large amount of carbon fines from a sand pack and therefore there are limits concerning how much carbon fines may be attached to sand particles for second functionality.

However, carbon fines and other adsorbent particles may be fixated onto the sand by nanoparticles so that they are not readily washed off by water (please see Table I below). With the ability to fixate coal and activated carbon onto porous media particles, it has been discovered that the unique properties of carbon fines can remove organic materials like D-limonene (please see Table II below). The concept of the method and composition is thus proven and appears to indicate that by optimization of the type and the amount of nanoparticles, porous media, along with the type and the amount of carbon particles, there may be an ability to remove many types of organic materials from aqueous fluids.

Additionally, this method is expected to have novelty over other water purification methods due to the fact that it may be easily recharged. For instance, in one non-limiting embodiment, the organic materials, nanoparticles and carbon fines may be stripped from the substrate particles in the bed by a lightly acidic solution (in a non-limiting instance, citric acid), and use water or the like to recharge the particle media bed with new nano and carbon particles. The ability to strip and recharge sand and other particle media may have better utility for some applications or be easier for removal and disposal of toxic organic materials extracted from water, or alternatively possibly may be a more cost effective method compared to disposal of pollutants and the filtration media by other means. Additionally, this method may be used within a more multistage filtration system, for instance as one of the water filtration process steps. In another non-restrictive version, more than one optimized filtration media (nanoparticles with carbon particles on porous media) may be used in series to give different degrees of organic material removal utility.

In more detail, the surface active porous medium includes a bed of substrate particles. The substrate particles may include, but are not necessarily limited to, sand, gravel, ceramic beads, glass beads, and combinations thereof. The average particle size of the substrate particles may range from about 200 independently to about 4 mesh (about 74 to about 4760 microns); alternatively they may range from about 100 independently to about 40 mesh (about 149 to about 400 microns). When used in connection with a range herein, the word "independently" means that any lower threshold may be combined with any upper threshold to create a suitable alternative range.

The nanoparticles completely or at least partially coat or cover the substrate bed, that is, the outer surface of the substrate particles in the bed of the surface active porous medium. In one non-limiting embodiment, the nanoparticles, such as magnesium oxide having an average particle size of about 30 nm, at least partially or completely coat the substrate particles. These nanoparticles will in turn fixate coal fines within the substrate particles of the bed and largely prevent them from migrating or moving. The nanoparticles in the surface active porous medium will hold or fixate the adsorbent particles (e.g. coal fines, activated carbon, etc.) and keep them from moving through the effects of the surface forces (van de Waals force, electrostatic force, etc.) of the nanoparticles, in one non-limiting explanation. That process and those effects will keep most of adsorbent particles in place.

It is theorized that the nanoparticles remain on the substrate particles primarily by electrostatic and other charges between the nanoparticle and proppant particle surfaces, however, other attractions or coupling forces may exist to initially and over the long-term keep the nanoparticles coated on the substrate particles. The inventors do not want to be limited to any particular theory. However, certain agents may be added to the surface active porous medium that may further enhance the initial and/or long-term nanoparticle attraction to the quartz, glass, ceramic and the like substrate particles composition. Additionally, the surface of the substrate particles, or a select amount of the substrate particles, may be treated with agents that may improve the overall attraction of the nanoparticles to the proppant.

The adsorbent particles fixated on and with the nanoparticles, may include, but are not necessarily limited to, coal fines, activated carbon, activated charcoal, activated coal and combinations thereof. As defined herein, coal fines are carbonaceous (i.e. predominantly carbon-based) particles being ground to or having an average particle size less than about 150 microns, alternatively less than about 75 microns ($\mu$m). Generally, the adsorbent particles may have an average particle size ranging from about 4 independently to about 150 microns alternatively from about 12 independently to about 75 microns. These size ranges are suitable for the mean particle size of all of the adsorbent particles.

It has been discovered that nano-sized particles like magnesium oxide (MgO) may be used to fixate coal fines and other adsorbent particles onto substrate particles in a surface active porous medium to adsorb, inhibit, restrain, prevent or otherwise remove organic materials from a fluid in contact with or flowing through or over the surface active porous medium. Some nano-sized particles, also called nanoparticles herein, not only have high surface areas compared to their small sizes, but also have relatively high surface charges that permit them to associate or connect or fixate other particles together, including other charged particles, but also other non-charged particles. In one non-limiting embodiment, these associations or connections between the adsorbent particles and the nano-sized particles are due to electrical attractions and other intermolecular forces or effects.

As will be shown, laboratory tests have demonstrated that relatively small amounts of MgO nanoparticles can fixate and inhibit the movement of dispersed adsorbent particles, such as coal fines. Other nanoparticles such as ZnO, Al2O3, zirconium dioxide (ZrO2), TiO2, cobalt (II) oxide (CoO), nickel (II) oxide (NiO), and pyroelectric and piezoelectric crystals may also be used in the methods and compositions herein.

Nano-sized particles of alkaline earth metal oxides, alkaline earth metal hydroxides, alkali metal oxides, alkali metal hydroxides, transition metal oxides, transition metal hydroxides, post-transition metal oxides, and post-transition metal hydroxides, piezoelectric crystals, pyroelectric crystals, and mixtures thereof have been discovered to have particular advantages for fixating adsorbent particles, e.g. coal fines, so that they can adsorb organic material from an aqueous fluid.

Magnesium oxide particles and powders have been suitably used to fixate adsorbent particles herein. However, it will be appreciated that although MgO particles are noted throughout the description herein as one representative or suitable type of alkaline earth metal oxide and/or alkaline earth metal hydroxide particle, other alkaline earth metal oxides and/or alkaline earth metal hydroxides and/or transition metal oxides, transition metal hydroxides, post-transition metal oxides, and post-transition metal hydroxides, piezoelectric crystals, pyroelectric crystals, may be used in the methods and compositions herein. Additionally, the alkali metal oxides and/or hydroxides may be used alone or in combination with the alkaline earth metal oxides and hydroxides, and/or together with one or more transition metal oxide, transition metal hydroxide, post-transition metal oxide, post-transition metal hydroxide, piezoelectric crystal, and pyroelectric crystal.

By "post-transition metal" is meant one or more of aluminum, gallium, indium, tin, thallium, lead and bismuth. In another non-limiting embodiment herein, the nano-sized particles are oxides and hydroxides of elements of Groups IA, IIA, IVA, IIB and IIIB of the previous IUPAC American Group notation. These elements include, but are not necessarily limited to, Li, Na, K, Mg, Ca, Ti, Zn and/or Al.

The nano-sized particles herein may also be piezoelectric crystal particles (which include pyroelectric crystal particles). Pyroelectric crystals generate electrical charges when heated and piezoelectric crystals generate electrical charges when squeezed, compressed or pressed.

In one non-limiting embodiment, specific suitable piezoelectric crystal particles may include, but are not necessarily limited to, ZnO, berlinite ($AlPO_4$), lithium tantalate ($LiTaO_3$), gallium orthophosphate ($GaPO_4$), $BaTiO_3$, $SrTiO_3$, PbZrTiO3, $KNbO_3$, $LiNbO_3$, $LiTaO_3$, $BiFeO_3$, sodium tungstate, $Ba_2NaNb_5O_5$, $Pb_2KNb_5O_{15}$, potassium sodium tartrate, tourmaline, topaz and mixtures thereof. The total pyroelectric coefficient of ZnO is −9.4 $C/m^2K$. ZnO and these other crystals are generally not water soluble.

In one non-limiting explanation, when the surface active porous medium contains very small pyroelectric crystals, such as nano-sized ZnO, if the medium is subjected to relatively high temperatures and/or pressure, the pyroelectric crystals are heated and/or pressed and high surface charges are generated. These surface charges permit the crystal particles to associate, link, connect or otherwise relate the adsorbent particles together to fixate them together and also to the substrate particles.

In one non-limiting embodiment, the nano-sized solid particles and powders useful herein include, but are not necessarily limited to, slowly water-soluble alkaline earth metal oxides or alkaline earth metal hydroxides, or mixtures thereof. In one non-limiting embodiment, the alkaline earth metal in these additives may include, but are not necessarily limited to, magnesium, calcium, barium, strontium, combinations thereof and the like. In one non-limiting embodiment, MgO may be obtained in high purity of at least 95 wt %, where the balance may be impurities such as $Mg(OH)_2$, CaO, $Ca(OH)_2$, $SiO_2$, $Al_2O_3$, and the like.

In another non-limiting embodiment, the particle size of the solid nano-particles ranges between about 1 nanometer independently up to about 500 nanometers. In another non-limiting embodiment, the particle size ranges between about 4 nanometers independently up to about 100 nanometers. In another non-restrictive version, the particles may have a mean particle size of about 100 nm or less, alternatively about 90 nm or less, and in another possible version about 50 nm or less, alternatively 40 nm or less.

In one non-limiting embodiment, in the surface active porous medium, the loading of the nanoparticles ranges from about 0.001 independently to about 10% by weight (bw); alternatively from about 0.01 independently to about 1% bw. Further, the loading of the adsorbent particles ranges from about 0.01 independently to about 20% bw; alternatively from about 0.1 independently to about 2% bw. The substrate particles, nanoparticles and adsorbent particles are all solids in the context of the surface active porous medium and the purification or filtration methods herein.

The surface active porous medium may be prepared by passing a carrier fluid containing the nanoparticles alone or the nanoparticles together with the adsorbent particles over or through the substrate particles. The carrier fluid may be aqueous or brine (where the salts are as noted below) and possibly an alcohol or glycol, so long as substantially all of the alcohol or glycol carrier is removed prior to using the surface active porous medium to remove or purify a subsequent fluid. If the surface active porous medium is prepared in stages, it is expected that the nanoparticles will be applied to the substrate particles first, and then a second, different carrier fluid containing the absorbing particles is applied to the substrate particles. However, the carrier fluids in both stages may be aqueous.

The contaminated fluid containing the organic material may include, but not necessarily be limited to, water, and brine, More specifically, and in non-limiting embodiments, the brines may contain salts including, but not necessarily limited to, NaCl, KCl, $CaCl_2$, $MgCl_2$, $NH_4Cl$, $CaBr_2$, NaBr, sodium formate, potassium formate, and other commonly used brine salts. The brine may contain one or more of the mentioned salts, such as a brine containing KCl, NaCl and $CaCl_2$, or NaCl, $CaCl_2$, and $CaBr_2$ as non-limiting examples.

While certainly a goal of the methods described herein is to remove all or 100 wt % of the organic material from the fluid, the method is still considered successful if less than all of the organic material is removed. In non-limiting examples, at least 90 wt % of the material may be removed, alternatively at least 80 wt % of the material may be removed and in another non-restrictive version at least 70 wt % of the organic material is removed.

The method herein also includes regeneration or recharging of the surface active porous medium where the regenerating or recharging includes contacting the surface active porous medium with an acid solution thereby substantially removing the organic materials therefrom. For instance, in one non-limiting embodiment, the organic materials, nanoparticles and adsorbent particles (e.g. carbon fines) may be stripped from the substrate particles in the medium bed by a lightly acidic solution (in a non-limiting instance, a 1 wt % citric acid), and use water or the like to recharge the particle media bed with new nano and carbon particles. Suitable acids include, but are not necessarily limited to, various organic and inorganic acids, which may be, but are not particularly restricted to, citric acid, acetic acid, fumaric acid, sulfamic acid, oxalic acid, tartaric acid, glutaric acid, glycolic acid, hydrochloric acid, phosphoric acid, sulfuric acid, and combinations thereof. The strength or concentration of such acid recharging solutions may range from about 0.25 wt % independently to about 40 wt %; alternatively from about 1 wt % independently to about 20 wt %. The recharging solution should contact the surface active porous medium for an amount of time effective to remove the organic materials, nanoparticles and adsorbent particles, for instance from about 0.5 minutes independently to about 60 minutes; alternatively from about 2 minutes independently to about 15 minutes. While it is certainly acceptable to remove all (100%) of the organic materials, nanoparticles and adsorbent particles are removed from the surface active porous medium in the recharging step, the recharging step is considered successful if at least 90 wt % of the organic materials, nanoparticles and adsorbent particles are removed; alternatively if at least 80 wt % of the organic materials, nanoparticles and adsorbent particles are removed. Substantially removing the organic materials is defined as at least 95 wt % of them.

The ability to strip and recharge sand and other particle media may have better utility for some applications or be easier for removal and disposal of toxic organic materials extracted from water and other fluids, or alternatively possibly may be a more cost effective method compared to some other conventional disposal of pollutants and the filtration media used therefore.

It is expected that in another non-restrictive version, more than one optimized filtration media (nanoparticles with carbon particles on porous media) may be used in series with other filtration or purifying techniques to give different degrees of organic material removal.

The invention will be further described with respect to the following Examples which are not meant to limit the invention, but rather to further illustrate the various embodiments.

EXAMPLES 1 TO 6

Carbon and Coal Particle Wash-Off Tests

FIG. 1 is a photograph of the test set-up for proving the method concept showing a surface active porous medium containing 100 grams of 40/60 mesh (400 micron/250 micron) UNIMEN quartz sand in a vertically-oriented, 1-inch inner diameter (ID) (2.54 cm) acrylic tube having a screen and a valve in the bottom thereof to drain filtered or purified fluid into a beaker.

The surface active porous medium consisted of 40/60 mesh (400 micron/250 micron) UNIMEN quartz sand and adsorbent particles that were either activated carbon (average particle size <200 mesh fines (<74 microns)) or anthracite coal. The activated carbon was SPECTRUM Activated Carbon product C1191. The anthracite was WARD high grade anthracite ground and sieved to <325 mesh fines (<44 microns). In the cases where nanoparticles were used, they were MgO nanometer-sized particles (N-801, average particle size about 35 nm)

Figure 2:
FIG. 2 is a photograph of two glass containers where the one on the left contains anthracite coal fines on 40/60 mesh (400 micron/250 micron) UNIMEN quartz sand only and the container on the right holds the same material, however the coal fines were fixated onto the 40/60 mesh (400 micron/250 micron) sand by N-801 nanoparticles.

FIG. 2 is a photograph of two glass containers where the one on the left contains anthracite coal fines on the UNIMEN quartz sand only and the container on the right holds the same material, however the coal fines were fixated onto the UNIMEN sand by N-801 nanoparticles.

Table I shows carbon and coal fines wash off of 40/60 mesh UNIMEN quartz sand (Examples 1-3) whereas the N-801 nanoparticles appeared to fixate the carbon and coal fines onto the sand grains (Examples 4-6). Note that the effluents of the latter were clear or slightly dark as compared to the dark, fairly dark or moderately dark effluents of the former which indicated that the adsorbent particles were being washed off.

TABLE I

Carbon and Coal Particle Wash-Off Tests

| Ex. | Test fluid | Nanoparticles | Activated Carbon | Anthracite | Effluent (first 20 mls) | Effluent (next 50 mls) |
|---|---|---|---|---|---|---|
| 1 | Water | — | 0.2/% bw | — | Moderately dark | Slightly dark |
| 2 | Water | — | — | 0.2% bw | Moderately dark | Slightly dark |
| 3 | Water | — | — | 0.8% bw | Dark | Fairly dark |
| 4 | Water | 0.1% bw | — | 0.2% bw | Clear | Clear |
| 5 | Water | 0.1% bw | — | 0.4% bw | Clear | Clear |
| 6 | Water | 0.1% bw | — | 0.8% bw | Slightly dark | Clear |

EXAMPLES 7 AND 8

Organic Material Removal Tests

Figure 3:
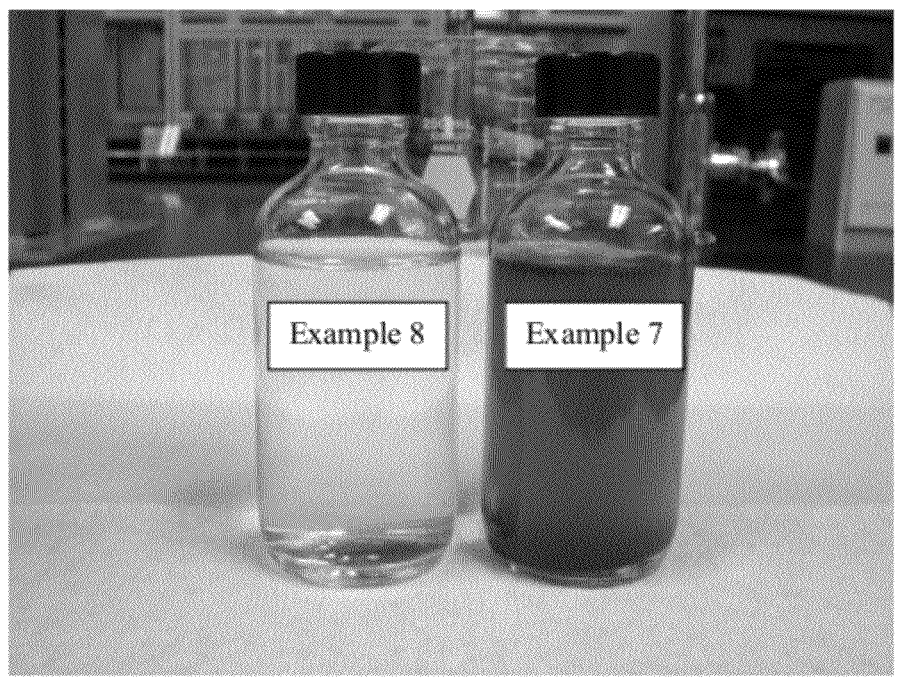
FIG. 3 is a photograph of two bottles, where the bottle on the left is effluent sample listed Table II that used 0.2% bw anthracite coal fines fixated by 0.1% bw N-801 nanoparticles showing the effluent was clear after 50 mls (Example 8), where the 50 ml bottle on the right shows that without nanoparticles the anthracite fines were produced along with the D-limonene during the filtration test (Example 7).
Figure 4:
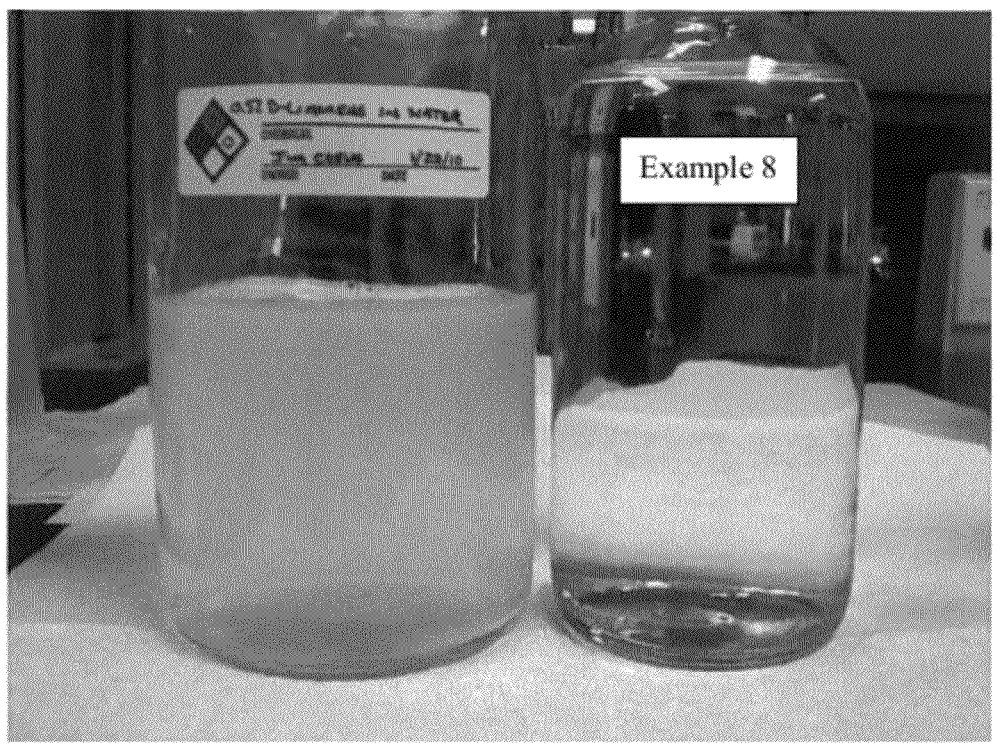
FIG. 4 is a photograph of two bottles, where the bottle on the right is the "next 500 mls" effluent sample listed in Table II that used the 0.2% bw anthracite coal fines fixated by 0.1% bw N-801 nanoparticles showing the effluent was still clear after 500 mls of filtration of D-limonene in water (Example 8). The bottle on the left shows a sample of 0.5 vol % D-limonene in water used during the filtration test.

The organic material being removed from water in these tests was D-limonene. Example 7 Table II shows that without nanoparticles that anthracite fines with D-limonene were produced during filtration test (the bottle on the right in FIG. 3) but in contrast the Example 8 test with N-801 nanoparticles appeared to hold coal fines and remove D-limonene from tap water as shown in the bottle on the left in FIG. 3. The bottle on left of FIG. 4 is a sample of the 0.5% d-limonene in water used for the filtration tests. The test with the N-801 nanoparticles showed that the effluent was still clear after 500 mls of filtration of D-limonene in water. That is, the bottle on the right in FIG. 4 is the "next 500 mls" effluent sample listed in Table II for the 0.2% bw anthracite coal fines fixated by 0.1% bw N-801 nanoparticles showing the effluent was still clear after 500 mls of filtration of D-limonene in water.

TABLE II

Carbon and Coal Particle Wash-Off Tests

| Ex. | Test fluid | Nanoparticles | Anthracite | Effluent (First 20 mls) | Effluent (Next 50 mls) | Effluent (Next 500 mls) |
|---|---|---|---|---|---|---|
| 7 | 0.5% by D-limonene in water | — | 0.2% bw | Moderately dark | Slightly dark | D-limonene haze |
| 8 | 0.5% by D-limonene in water | 0.1% bw N-801 | 0.2% bw | Clear | Clear | Clear |

In the foregoing specification, it will be evident that various modifications and changes may be made thereto without departing from the broader spirit or scope of the invention as set forth in the appended claims. Accordingly, the specification is to be regarded in an illustrative rather than a restrictive sense. For example, specific combinations of substrate particles, nanoparticles and adsorbent particles of varying types and various sizes, fluids, organic materials, and other components falling within the claimed parameters, but not specifically identified or tried in a particular composition, are anticipated to be within the scope of this invention.

The words "comprising" and "comprises" as used throughout the claims is to interpreted "including but not limited to".

The present invention may suitably comprise, consist or consist essentially of the elements disclosed and may be practiced in the absence of an element not disclosed. For instance, in one non-limiting embodiment, there is provided a method for removing organic material from a fluid, which method consists of or consists essentially of contacting a surface active porous medium with the fluid containing at least one organic material, where the surface active porous medium consists of or consists essentially of a bed of substrate particles, at least a partial coating of nanoparticles on the substrate bed and a plurality of adsorbent particles fixated on the nanoparticles, where the adsorbent particles are as defined herein where the method further consists of or consists essentially of adsorbing at least part of the at least one organic material from the fluid by the adsorbent particles.

Alternatively, there is provided a surface active porous medium configured to remove at least one organic material from a fluid containing the at least one organic material, where the surface active porous medium consists of or consists essentially of a bed of substrate particles, at least a partial coating of nanoparticles on the substrate particle bed, and a plurality of adsorbent particles fixated on the nanoparticles, where the adsorbent particles are selected from the group consisting of coal fines, activated carbon, activated charcoal, activated coal and combinations thereof.

What is claimed is:

1. A method for removing D-limonene from water, the method comprising:
    contacting a surface active porous medium with the water containing D-limonene, where the surface active porous medium comprises:
        a bed of quartz sand substrate particles,
        at least a partial coating of magnesium oxide nanoparticles fixated on the quartz sand substrate particle bed, where the particle size of the magnesium oxide nanoparticles ranges from about 1 to about 500 nanometers, and
        a plurality of adsorbent anthracite coal fines fixated on the magnesium oxide nanoparticles; and
        adsorbing at least part of the D-limonene on the adsorbent anthracite coal fines.

2. The method of claim 1 where in the surface active porous medium:
    loading of the magnesium oxide nanoparticles ranges from about 0.001 to about 10% bw; and
    loading of the adsorbent anthracite coal fines ranges from about 0.01 to about 20% bw.

3. The method of claim 1 where the mean particle size of the adsorbent anthracite coal fines ranges from about 4 to about 150 microns.

4. The method of claim 1 where the magnesium oxide nanoparticles have a mean particle size of about 4 nm to about 100 nm.

5. The method of claim 1 where in the adsorbing, at least 50% of the D-limonene is absorbed from the water.

6. The method of claim 1 further comprising: regenerating the surface active porous medium, where the regenerating comprises contacting the surface active porous medium with an acid solution thereby substantially removing the adsorbent anthracite coal fines, the magnesium oxide nanoparticles, and the D-limonene therefrom, and using water to recharge the surface active porous medium with new magnesium oxide nanoparticles and new adsorbent anthracite coal fines.

7. The method of claim 6 where at least 90 wt % of the D-limonene is removed from the surface active porous medium.

8. A method for removing D-limonene from water, the method comprising:
    contacting a surface active porous medium with the water containing D-limonene, where the surface active porous medium comprises:
        a bed of quartz sand substrate particles,
        at least a partial coating of magnesium oxide nanoparticles fixated on the substrate particle bed, where the particle size of the magnesium oxide nanoparticles ranges from about 1 to about 500 nanometers, and
        a plurality of adsorbent anthracite coal fines fixated on the magnesium oxide nanoparticles, where the mean particle size of the adsorbent anthracite coal fines ranges from about 4 to about 150 microns; and
    adsorbing at least part of the D-limonene on the adsorbent anthracite coal fines;
    where loading of the magnesium oxide nanoparticles ranges from about 0.001 to about 10% bw; and loading of the adsorbent anthracite coal fines ranges from about 0.01 to about 20% bw.

9. The method of claim 8 further comprising: regenerating the surface active porous medium, where the regenerating comprises contacting the surface active porous medium with an acid solution thereby substantially removing the adsorbent anthracite coal fines, the magnesium oxide nanoparticles, and the D-limonene therefrom, and using water to recharge the surface active porous medium with new magnesium oxide nanoparticles and new adsorbent anthracite coal fines.

* * * * *